June 23, 1931.  F. R. HICKS, JR., ET AL  1,811,234
APPARATUS FOR REFRIGERATING AND DISPENSING BEVERAGES
Filed Jan. 17, 1928  4 Sheets-Sheet 1
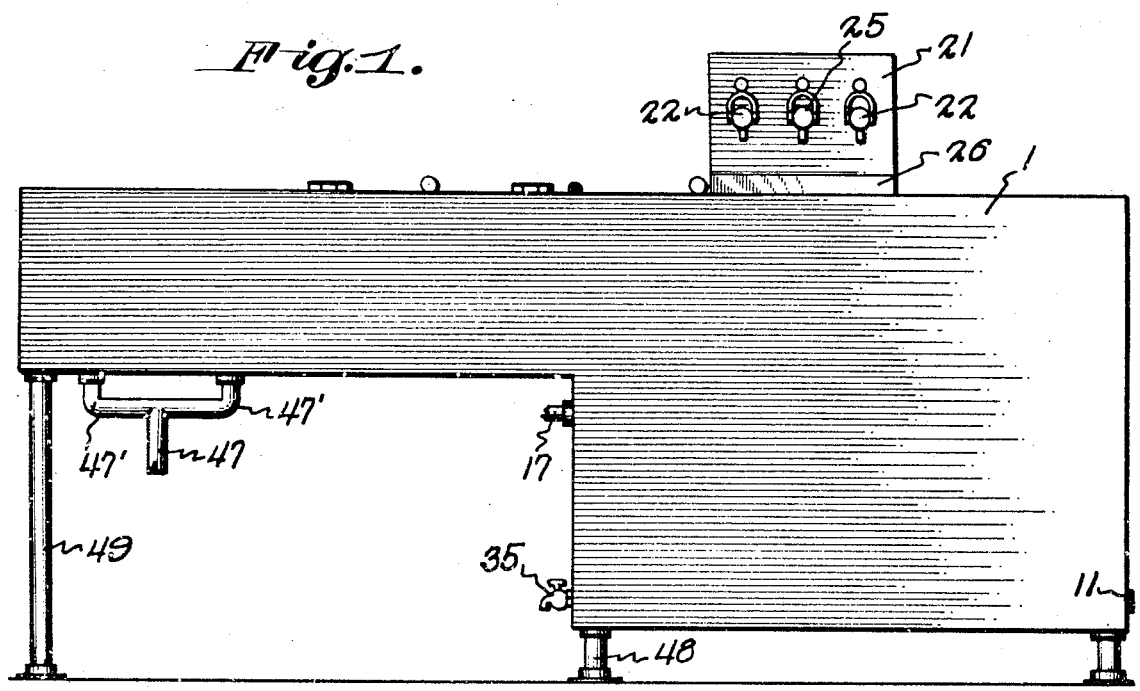
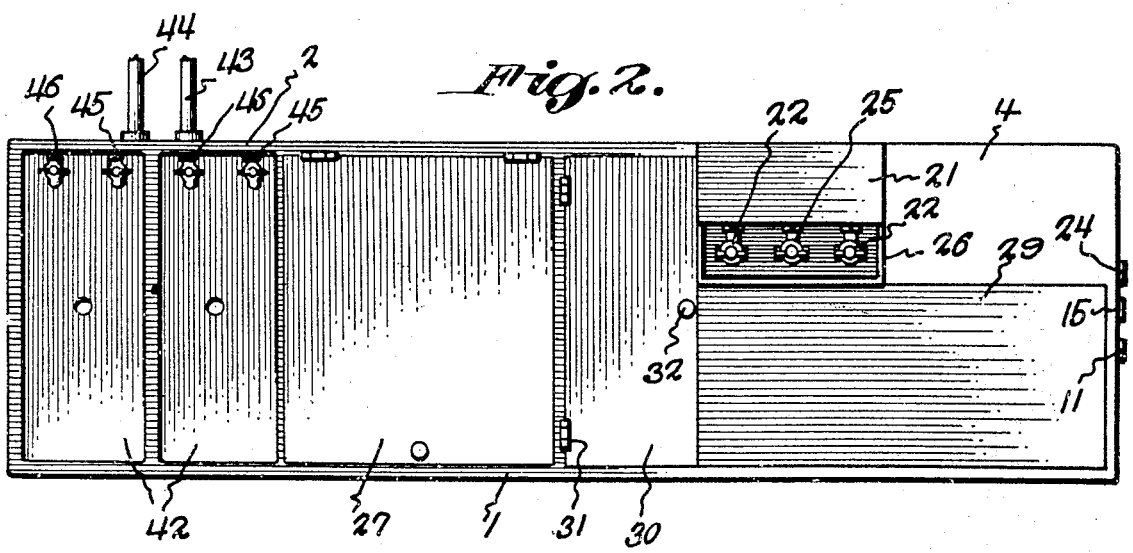
Frank R. Hicks Jr., Inventor
Frank A. Mayes

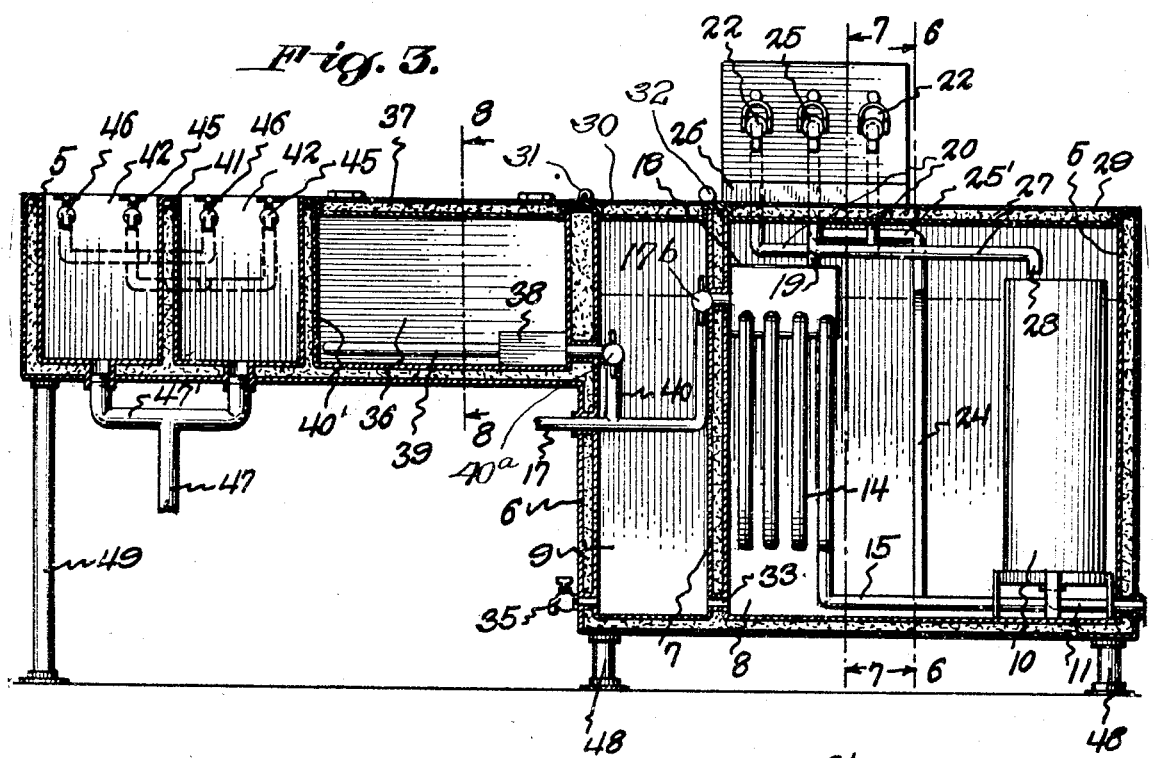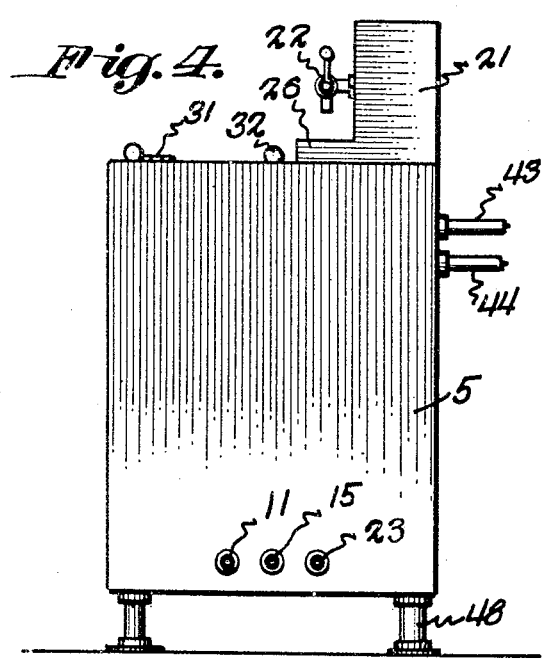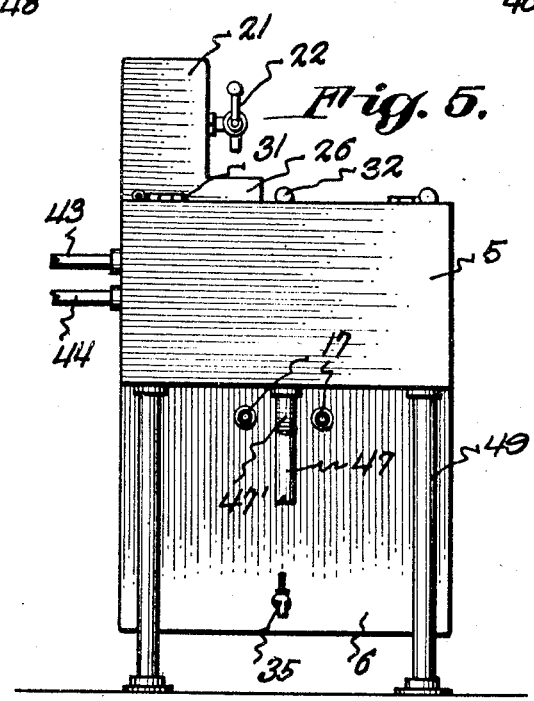

June 23, 1931. F. R. HICKS, JR., ET AL 1,811,234
APPARATUS FOR REFRIGERATING AND DISPENSING BEVERAGES
Filed Jan. 17, 1928 4 Sheets-Sheet 3
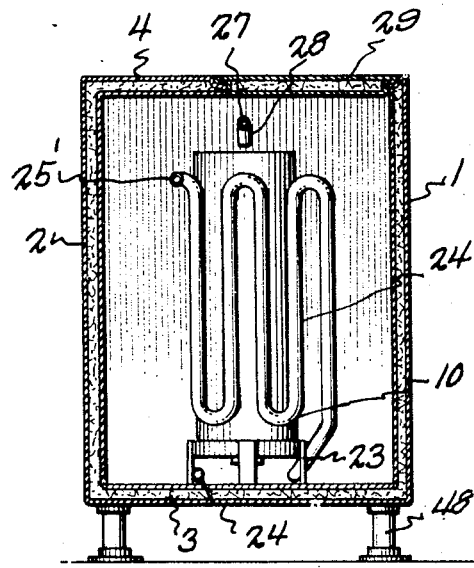
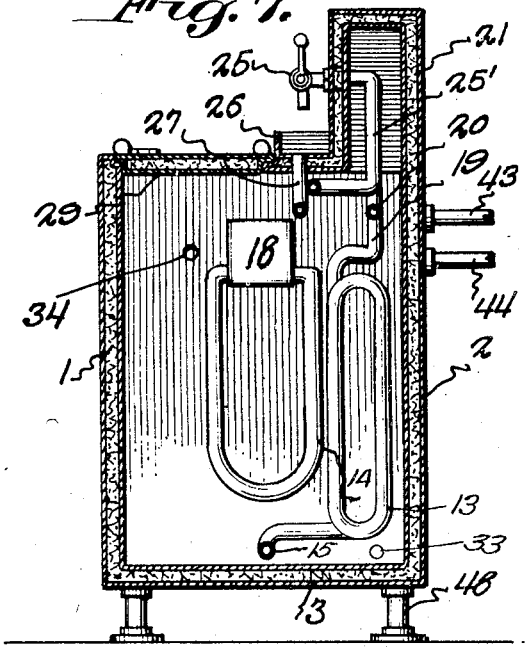
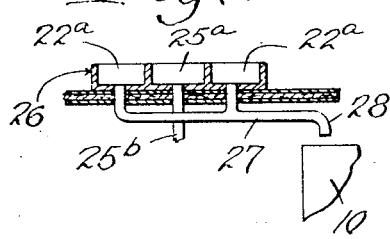
Frank R. Hicks Jr., Frank A. Mayes, Inventor

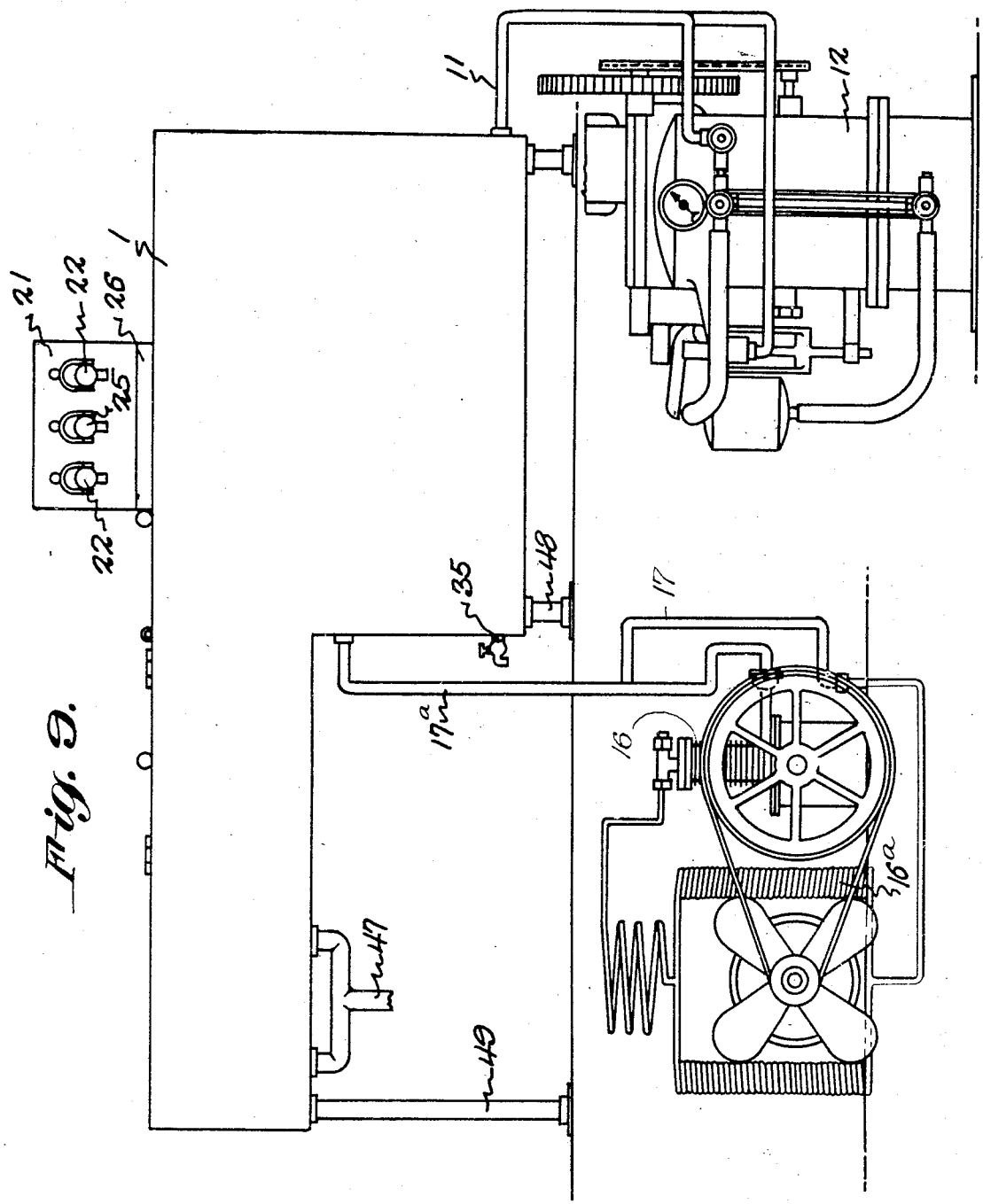

Patented June 23, 1931

1,811,234

UNITED STATES PATENT OFFICE

FRANK R. HICKS, JR., AND FRANK A. MAYES, OF SHREVEPORT, LOUISIANA

APPARATUS FOR REFRIGERATING AND DISPENSING BEVERAGES

Application filed January 17, 1928. Serial No. 247,342.

This invention relates to improvements in dispensing apparatus and more particularly to an apparatus for dispensing beverages, and one of the objects of the present invention is to provide an apparatus so constructed that carbonated beverages may be dispensed in a more sanitary manner than is at present possible, in the use of ordinary apparatuses.

Another object of the invention is to provide, in an apparatus of this class, a novel arrangement of the several units comprising the same, which arrangement will provide for the more ready dispensing of carbonated beverages and bottled beverages than is possible by the use of dispensing apparatuses of the ordinary construction, the invention contemplating, in this connection, an apparatus embodying a carbonator, a compressor, a syrup tank or reservoir, and means whereby the syrup, mixed with a suitable quantity of water, may be automatically carbonated and compressed, and delivered from a faucet, the arrangement being such as to insure of sanitary conditions in all of the operations essential to the preparation of the beverage for dispensing the same.

Another object of the invention is to provide an exceptionally convenient arrangement, in an apparatus of this class, of beverage dispensing means of the character above outlined, in combination with a refrigerated service cabinet in which bottled beverages or the like may be stored, and a storage compartment for glasses in which the glasses will be previously cooled so that the beverage delivered into the glasses, at the time of dispensing the beverage, will be maintained in its cooled or chilled condition and therefore be more refreshing and palatable than if dispensed in glasses not previously cooled.

Another object of the invention is to provide, in an apparatus of this class, means for maintaining the various units at a uniform degree of temperature without the employment of ice, thus further insuring of a sanitary handling of the beverage to be dispensed.

Another object of the invention is to provide a dispensing apparatus embodying means for delivering a carbonated beverage directly through a faucet, thus obviating the usual process of dispensing which involves the steps of first delivering into the dispensing glass a quantity of the syrup and then delivering into the glass a quantity of carbonated water, and finally stirring the mixture.

Another object of the invention is to provide a dispensing apparatus of the class referred to embodying a service cabinet in which bottled beverages, supplies of various kinds, such as cold meats, or the like, may be kept in a cool state under sanitary conditions.

While the accompanying drawings and the description which is to follow, constitute a disclosure of the preferred embodiment of the invention, it will be understood that various changes may be made within the scope of what is claimed.

In the accompanying drawings:

Figure 1 is a view in front elevation of the apparatus embodying the invention;

Figure 2 is a top plan view thereof;

Figure 3 is a vertical longitudinal sectional view through the apparatus;

Figure 4 is an end elevation of one end of the apparatus;

Figure 5 is a similar view of the opposite end of the apparatus;

Figure 6 is a vertical front to rear sectional view taken substantially on the line 6—6 of Figure 3 looking in the direction indicated by the arrows;

Figure 7 is a similar view on the line 7—7 of Figure 3;

Figure 8 is a similar view on the line 8—8 of Figure 3;

Figure 9 is a schematic view of the apparatus, and

Figure 10 is a detail sectional view of the drip pan for the syrup and water faucets of the apparatus.

The apparatus embodying the invention is preferably constructed in the form of a substantially oblong rectangular cabinet and the walls of the cabinet will preferably be of sheet metal and insulated by the use of any material found suitable for the purpose, the walls being exteriorly and interiorly enameled or otherwise finished so as to be not only sanitary, but also to present an attractive appearance.

Generally speaking, the cabinet comprises a front wall 1, a rear wall 2, a bottom 3, and a top 4, and, as will be observed by reference to Figures 1 and 3 of the drawings, the cabinet is of considerably greater depth throughout one-half its length than throughout the other half of its length, for a purpose which will presently be described. One end wall of the cabinet is indicated by the numeral 5 and constitutes likewise one end of the deeper half of the cabinet, the other end wall of this half of the cabinet being indicated by the numeral 6, and these walls, in connection with the front, rear, bottom and top walls, defining a rectangular enclosed space divided by a partition wall 7 to provide compartments indicated one by the numeral 8 and the other by the numeral 9. A tank 10 is arranged within the compartment 8 and serves as a reservoir for the syrup constituent of the beverage to be dispensed, and a pipe 11 leads from the bottom of this tank to a carbonator which is shown schematically in Figure 9 of the drawings and is indicated by the numeral 12 and which carbonator may be of any of the well known types now in use. The syrup which flows by gravity from the tank 10 to the apparatus 12 by way of the pipe 11, is mixed with water and carbonated in said apparatus, and this carbonated mixture is delivered from the apparatus 12 by way of a pipe 15 to a cooling coil 13 located within the compartment 8. A delivery pipe 19 leads from the other end of the cooling coil 13 and is provided with branches 20 which extend therefrom and upwardly into a hollow upward extension 21 of the compartment 8, this extension 21 being located at the rear of the top of said compartment and the said branches 20 being placed in communication with faucets 22 arranged upon the front wall of the extension 21 and providing means whereby the carbonated and cooled mixture or beverage may be drawn off into glasses. It will be understood that the carbonator 12 is of the type to which water is supplied and carbonated, and therefore the pipe 11, which leads from the syrup supply tank 10, will communicate with the water intake pipe of the carbonator or may be connected independently to the carbonating chamber of this unit, and the pipe 15 which leads from the carbonator to the coil 13 will of course conduct the mixture of syrup and water, which has been carbonated, to the coil. Another pipe 23 is led through the end wall 5 of the cabinet and into the compartment 8, from a suitable source of water supply, and communicates with a water cooling coil 24 which is arranged in upright position within said compartment, a pipe 25′ being led from the upper or other end of the cooling coil 24 to a water faucet 25 which is likewise mounted upon the front of the extension 21 of the cabinet and is preferably located between the faucets 22. Preferably a drain pan 26 is either arranged or constructed upon the top 4 of the cabinet in front of the extension 21 and beneath the faucets 22 and 25 and is intended to collect any drippings from the faucets. The pan 26 is, as shown in Figure 10, provided with compartments 22$^a$ for the reception of the drippings of the faucets 22, and it is provided with a compartment 25$^a$ for the reception of the drippings from the faucet 25. The drain pipe 25$^b$ is provided for the compartment 25$^a$. A drain pipe 27 is led from the compartments 22$^a$, through the top 4 of the cabinet and has a downturned discharge end 28 positioned above the syrup tank 10. It will be understood that in this manner any syrup or beverage which may drip from the faucets 22 will be delivered to the syrup tank 10 thus avoiding any waste. The top of the compartment 8 is preferably open, in front of the extension 21 and for substantially the entire length of the compartment, and a lid 29 is removably arranged within the open top and may be removed when repairs are required to be made to the parts of the apparatus housed within said compartment.

A refrigerating apparatus is employed to maintain the compartment 8 at the desired temperature. This apparatus is of the well known automatic type, and as shown, includes a refrigerator 14 arranged within the compartment 8, and a compressor 16 and a condenser 16$^a$ located outside of said compartment. A pipe 17 extends from the condenser 16$^a$ to the refrigerator 14, and a pipe 17$^a$ extends from the refrigerator to the compressor 16. A valve 17$^b$, known to the trade as a liquid line valve, is arranged between the pipe 17 and the refrigerator 14, and a valve, not shown and known to the trade as a suction line valve, is arranged between the refrigerator and the pipe 17$^a$.

The compartment 9 serves as a refrigerated service cabinet and is likewise open at its top, a lid 30 being provided for normally closing said open top and hinged at one side as at 31 at the upper end of the end wall 6 of said compartment, the lid being provided at its opposite side with a hand knob 32 whereby it may be conveniently swung to open and closed position. By reference to Figure 3 of the drawings it will be observed that the pipes 17 and 17$^a$ extend through the compartment 9, and consequently the air within this compartment is cooled. This compartment and the compartment 8 contain water, and to permit it to circulate within the two compartments passageways 33 and 34 are provided in the partition wall 7 respectively near the lower and upper ends of said wall. This compartment 9 may be employed to contain bottled beverages, cold meats, and other perishable food stuffs, placed in suitable water-tight containers, and therefore serves all of the purposes of an ice box or refrigerator. In order that the compartments 8 and 9 may be drained of the water contained therein, in the event the water becomes foul, a drain valve 35 is arranged near the bottom of the end wall 6 of the compartment 9 as clearly shown in Figures 1, 3 and 5 of the drawings.

The upper portion of the wall 6 of the cabinet constitutes a partition wall dividing the two halves of the cabinet and defines one end wall of a glass storage compartment which is indicated by the numeral 36, this compartment being provided at its open top with a hinged lid 37 by which access may be readily had to the interior of the compartment. Arranged within the said compartment 36 upon the bottom thereof is a cooling unit 38 including a coil 39 and supplied with the refrigerating medium, by way of a branch pipe 40 leading from the pipe 17 which pipe in turn leads from the condenser 16ª, and a branch pipe, not shown, leading from the unit to the pipe 17ª which in turn leads to the compressor 16. The branch pipe 40 is provided with a liquid line valve 40ª, and the other branch pipe is provided with a suction line valve. This compartment 36 constitutes a storage space for the glasses in which the beverage is to be dispensed, and due to the presence of the cooling unit and its coil within the compartment, the glasses arranged therein will be kept at a low degree of temperature and, when removed for use, will be sufficiently cold to adapt them to contain the beverage introduced thereinto, for a maximum period of time, without elevation in the temperature of the beverage.

The other end of the compartment 36 is closed by an end wall 40' which constitutes likewise a partition wall dividing the shallower half of the cabinet midway of its ends, and a second partition wall, indicated by the numeral 41, is arranged within this half of the cabinet between the partition wall 40' and the other end wall 5 of the cabinet, these walls, in conjunction with the front, rear, and bottom walls of this half of the cabinet, providing a pair of sinks indicated by the numeral 42. Supply pipes 43 and 44 are led respectively from cold and hot water sources of supply to cold and hot water spigots 45 and 46 upon the rear walls of the sinks 42, and these sinks may be employed for the purpose of washing the glasses in which the carbonated beverage is to be dispensed. The numeral 47 indicates a drain pipe which is provided with branches 47' which extend from its upper end in opposite directions and open through the bottoms of the sinks 42.

In order that the cabinet may be supported, relatively short legs 48 are provided beneath the four corners of the bottom of the deeper half of the cabinet, and longer legs 49 are provided beneath the outer corners of the bottom of the shallower half of the cabinet.

From the foregoing description of the invention it is evident that an exceptionally compact and handy arrangement of the component parts of a dispensing apparatus is produced by reason of the relative arrangement and combination of the component units herein illustrated and described, and it will likewise be evident that the arrangement greatly facilitates the dispensing of carbonated beverages as well as other commodities which are required to be kept at a low temperature. It will furthermore be evident that inasmuch as it is unnecessary to employ any ice in connection with the apparatus, the same is of a more sanitary nature than apparatuses which employ ice as the cooling medium.

Having thus described the invention, what we claim is:

1. In dispensing apparatus of the class described, a dispensing faucet, a liquid reservoir, a cooling unit, a refrigerating unit associated with the cooling unit, a coil communicating at one end with the dispensing faucet and disposed in juxtaposition to the cooling unit, a compartment in which the said reservoir, the cooling unit, and the coil are arranged, a compartment separated from and in communication with the first mentioned compartment, a wall dividing the said compartment, the wall having circulating passageways therein to provide for the circulation of water between the compartments, a storage compartment displaced with respect to the last mentioned compartment, and a cooling unit in the said storage compartment in communication with the pipes of the first mentioned cooling unit.

2. In dispensing apparatus of the class described, a cabinet divided to comprise adjacent compartments, a partition wall separating the compartments and having circulating passageways therein to provide for circulation of a fluid within the compartments, a cooling unit arranged within one of the compartments, a faucet arranged above said compartment, a coil arranged in juxtaposition to the cooling unit and within the first mentioned compartment, a dispensing faucet above the first mentioned compartment, a pipe leading from the delivery end of the coil to said faucet, a carbonating unit located exterior to the said compartment, a liquid reservoir within the first mentioned compartment, means establishing communication between the carbonating unit and the other end of the said coil, means establishing communication between the reservoir and the said carbonating unit, and a refrigerating unit having delivery and return pipes extending through the other compartment and through said partition wall and communicating with the cooling unit.

3. In dispensing apparatus of the class described, in combination, a cabinet structure of considerable depth throughout substantially one-half its length and of less depth throughout the other half of its length, a partition wall dividing the first mentioned half of the cabinet into compartments, a cooling unit within one of said compartments, a coil within said compartment, in juxtaposition to the cooling unit, a refrigerating unit exterior to the compartment and in communication with the cooling unit by way of pipes extending through the other compartment, a liquid reservoir within the first mentioned compartment, a faucet above the first mentioned compartment, one end of the coil being in communication with the said faucet, a carbonating unit exterior to the cabinet and communicating with the other end of the coil, a partition wall dividing the other half of the cabinet into compartments, one of said compartments constituting a cold storage compartment, a cooling unit and a coil in said cold storage compartment, supply pipes for the cooling unit leading from the supply pipes of the refrigerating unit to the said cooling unit through the second mentioned compartment in the first mentioned half of the cabinet, and a sink in the other portion of the second mentioned half of the cabinet.

4. In a dispensing apparatus of the class described, in combination, a cabinet structure of considerable depth throughout substantially one-half its length and of less depth throughout the other half of its length, a partition wall dividing the first mentioned half of the cabinet into compartments, a cooling unit within one of said compartments, a coil within said compartment, in juxtaposition to the cooling unit, a refrigerating unit exterior to the compartment and in communication with the cooling unit by way of pipes extending through the other compartment, a liquid reservoir within the first mentioned compartment, a faucet above the first mentioned compartment, one end of the coil being in communication with the said faucet, a carbonating unit exterior to the cabinet and communicating with the other end of the coil, and a partition wall dividing the other half of the cabinet into compartments, as and for the purposes set forth.

In testimony whereof we affix our signatures.

FRANK R. HICKS, Jr.
FRANK A. MAYES.